No. 747,817. PATENTED DEC. 22, 1903.
R. W. WILKE & M. BAUER.
AIR BRAKE COUPLING.
APPLICATION FILED JUNE 23, 1903.

NO MODEL.

Witnesses:
E. F. Wilson
F. Schlotfeld

Inventors:
Rudolph W. Wilke
Mathias Bauer
By Rudolph
Attorney.

No. 747,817. Patented December 22, 1903.

UNITED STATES PATENT OFFICE.

RUDOLPH W. WILKE, OF AUBURN PARK, AND MATHIAS BAUER, OF SOUTH ENGLEWOOD, ILLINOIS.

AIR-BRAKE COUPLING.

SPECIFICATION forming part of Letters Patent No. 747,817, dated December 22, 1903.

Application filed June 23, 1903. Serial No. 162,703. (No model.)

*To all whom it may concern:*

Be it known that we, RUDOLPH W. WILKE, residing at Auburn Park, and MATHIAS BAUER, residing at South Englewood, in the county of Cook, State of Illinois, citizens of the United States, have invented certain new and useful Improvements in Air-Brake Couplings; and we do hereby declare the following to be a full, clear, and exact description of the invention, such as will enable others skilled in the art to which it appertains to make and use the same.

Our invention relates to a novel construction in an air-brake coupling, the object being to provide a device of this character which almost completely shuts off the escape of air in case the train parts, so as to retain the forward end of the train under control of the engineer and cause the brakes on the rear end to set with sufficient rapidity to prevent collision with the forward end, but not to bring said rear end to a sudden stop; and it consists in the features of construction and combinations of parts hereinafter fully described and claimed.

Figure 1:
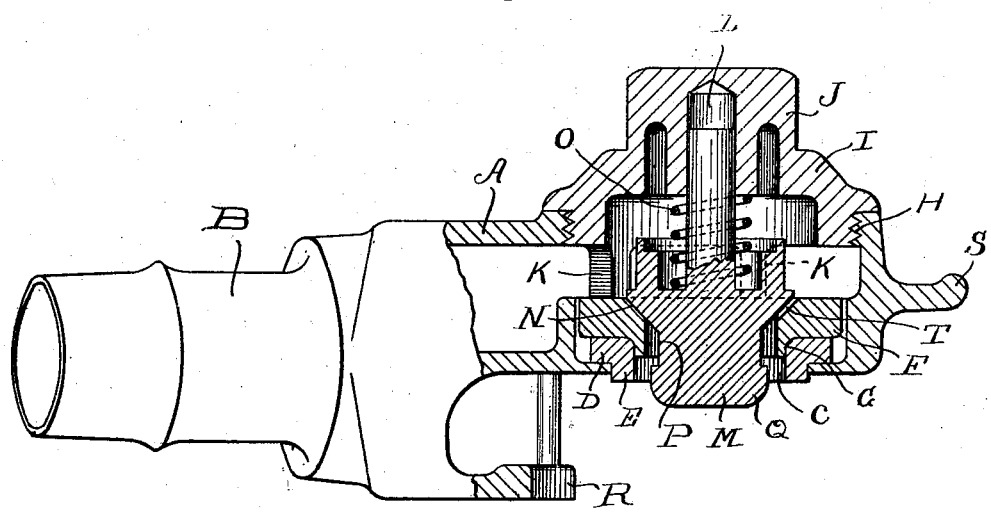
Figure 2:
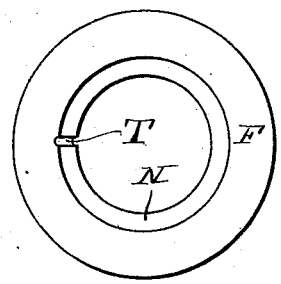

In the accompanying drawings, illustrating our invention, Figure 1 is a central longitudinal section of a coupling constructed in accordance with our invention. Fig. 2 is a plan view of the valve-seat employed.

Referring now to said drawings, A indicates the casing of a coupling member of the Westinghouse type, which is connected by means of the stem B with the air-brake system of the car and communicates through the opening C with a similar coupling member of the adjacent car, tender, or locomotive. Seated around said opening C is a rubber gasket D, which is provided with an annular flange E, passing through said opening C and projecting from the member A. Bearing upon said rubber gasket D is a metal gasket F, (which simultaneously forms a valve-seat,) which is provided with an annular flange G, projecting into the central opening in the gasket D and which serves to hold said gasket F in proper relative position. The opposite wall of said casing A is provided with a screw-threaded opening H, concentric with said opening C, and receives a threaded cap I, provided with a polygonal head J to receive a wrench. The said cap is provided with a plurality of fingers or projections K, which bear upon the gasket F and serve to compress the latter upon said gasket D. In the inner face of said cap I is a central cylindrical chamber L, which receives the stem of a valve M, which seats upon the valve-seat N of the gasket F and is normally held upon its seat by means of the spiral spring O, surrounding said valve-stem and bearing at its ends upon the inner face of said cap and upon said valve, respectively. At its other end said valve M is provided with a central projection or stem P of smaller diameter than the opening in said gasket F and which is provided with an enlarged head Q, also of smaller diameter than said opening in said gasket F, the outer projecting face of said head Q being flat and having rounded edges, so that in coupling the heads Q when brought in contact will readily mount each other, thereby forcing both valves from their seats and maintaining free communication between the two coupling members.

When coupled, the two members A, which are exactly alike, are relatively turned on the axes of the valves M as a center approximately, and are thus interlocked and forced together by the cam-flanges R and S until the flanges E of the gaskets D are compressed against each other to form an air-tight joint between the couplers. To facilitate this action, the heads Q are formed as above described, so that it is not necessary to exactly relatively center the coupling members before turning same, while their large diameter and rounded edges also serve to prevent either head from entering the annular space between the other head and the inner face of the gasket D, and thereby preventing the members A from readily parting and causing damage to one or other of the coupling members or the flexible tubes connecting same with the air-brake system; but when the train parts said heads will slip very readily without catching, and the valve M will immediately shut off the escape of air and prevent sudden stopping of both sections of the train. If the escape of air is entirely shut off, however, the engineer would remain in ignorance of the accident and the rear section would roll freely by impetus and in case of slowing up of the forward section would collide with the latter. To prevent this, we provide in the valve-seat N of each coupling member a groove T, which admits of the slow escape of air from both sections of the train. This will cause the rear section to come to a standstill very shortly by causing the brakes to set, while the air-compressor would be set to working with great rapidity by reason of the leak, thus signaling the engineer, without, however, causing the forward section to be taken from the control of the engineer. In this manner collision of the two sections is prevented. It is also essential that the air-escape opening be kept free of dirt and other clogging matter, and to this end we find it advantageous to place same in the valve-seat, when the blow of the valve will continually serve to loosen and throw out such matter.

Our invention is very simple and efficient and can be readily applied without removing the coupling members from the cars.

We claim as our invention—

An air-brake coupling comprising a casing having an air-outlet, a flexible gasket seated around said opening within said casing and having an annular flange projecting therefrom, a metal gasket seated on said flexible gasket, an annular flange on said metal gasket entering the opening in said flexible gasket to hold said metal gasket centered, a chamfered valve-seat in said metal gasket, an air-escape groove in said valve-seat, a removable cap mounted in the opposite wall of the coupling, projections on said cap bearing upon said metal gasket to hold same compressed on said flexible gasket, a central cylindrical chamber in said cap, a valve controlling the air-outlet and having a stem entering said chamber in said cap, a spring interposed between said cap and said valve for normally holding the latter on its seat, a projection at the other end of said valve projecting through the air-outlet, an enlarged head on said projection of smaller diameter than the air-outlet and a flat end and rounded edges on said head, said head projecting only slightly beyond the free end of the flange of the flexible washer and serving as a cam to be engaged by a similar head on the other coupling member when coupled therewith to open said valve, substantially as and for the purpose set forth.

In testimony whereof we affix our signatures in presence of two witnesses.

RUDOLPH W. WILKE.
MATHIAS BAUER.

Witnesses:
RUDOLPH WM. LOTZ,
E. F. WILSON.